Figure 1:
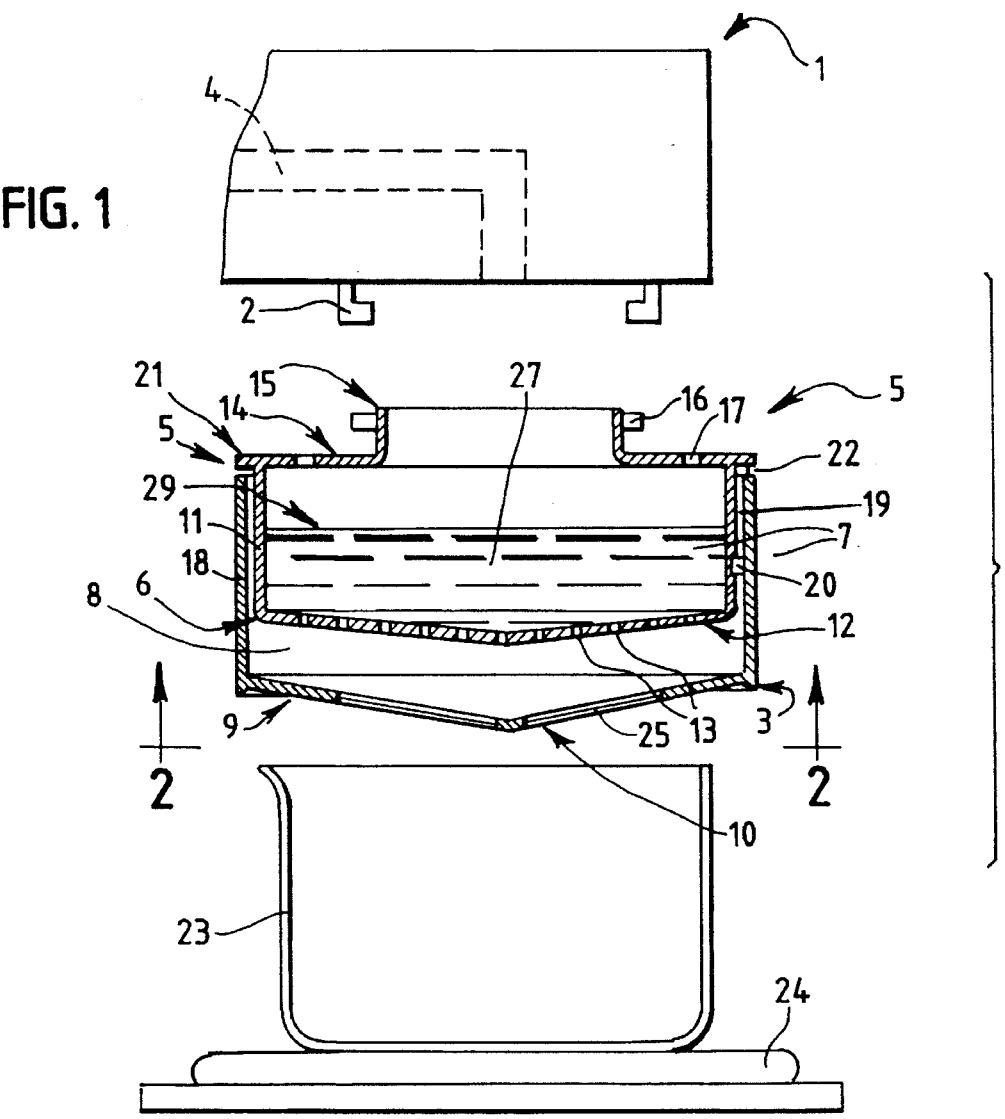

United States Patent [19]
Strub et al.

[11] Patent Number: 5,590,581
[45] Date of Patent: Jan. 7, 1997

[54] ASSEMBLY KIT FOR A FILTER COFFEE MAKER

[75] Inventors: Jürg Strub, Oberägeri; Ruedy Gasser, Bürglen, both of Switzerland

[73] Assignee: Maxs AG, Sachseln, Switzerland

[21] Appl. No.: 611,221

[22] Filed: Mar. 5, 1996

[30] Foreign Application Priority Data

Mar. 9, 1995 [DE] Germany .................. 295 04 115.3

[51] Int. Cl.[6] .................................................. A47J 31/24
[52] U.S. Cl. ........................................ 99/302 R; 99/295
[58] Field of Search .................. 99/275, 279, 295, 99/298, 299, 300, 302 R, 302 C, 302 P, 303, 316, 317; 429/433

[56] References Cited

U.S. PATENT DOCUMENTS

| | | | |
|---|---|---|---|
| 3,450,024 | 6/1969 | Martin | 99/295 |
| 3,599,557 | 8/1971 | Leal | 99/302 R |
| 4,757,753 | 7/1988 | Pandolfi | 99/302 R |
| 5,325,765 | 7/1994 | Sylvan | 99/295 |
| 5,443,555 | 8/1995 | Fischer | 99/302 R |

*Primary Examiner*—Robert W. Jenkins
*Attorney, Agent, or Firm*—Tilton, Fallon, Lungmus & Chestnut

[57] ABSTRACT

The invention relates to an assembly kit for a filter coffee maker as an attachment to an electrical espresso machine, which is adapted to make filter coffee of good taste in simple manner. According to the invention, this is achieved by an assembly kit for a filter coffee maker as an attachment to an electrical espresso machine which has a filter carrier adapted to be attached through a bayonet-type coupling and having a coffee chamber for receiving coffee powder, and which supplies hot water and/or steam through a pressure channel to the coffee chamber of the filter carrier, with the attachment being of two-part design, with a first part having a large-volume hot water chamber following the pressure channel for almost complete receipt of the water supplied via the pressure channel, with at least one through-opening being formed in the bottom of said first part, and furthermore with a second part being provided with the coffee chamber disposed underneath the hot water chamber for receipt of the coffee powder, with the bottom thereof being provided with a coffee filter.

16 Claims, 1 Drawing Sheet

U.S. Patent  Jan. 7, 1997  5,590,581

ASSEMBLY KIT FOR A FILTER COFFEE MAKER

The present invention relates to an assembly kit for a filter coffee maker as an attachment to an electrical espresso machine.

In practical application, espresso machines are known in which water is filled into a pressure chamber and the latter is heated. By such heating, steam is generated in the pressure chamber, which forces the water from the chamber through a pressure channel and injects it into a coffee chamber. The high temperature of the water solves the aromatic espresso substances from the espresso coffee powder contained in the coffee chamber and, together with the water, these substances are forced through a filter and collected in a receiving container.

A disadvantage of such espresso machines is no normal filter coffee can be made with them. The high pressure and the high temperature of the hot water extract bitter substances from conventional coffee powder, giving the finished coffee a bitter taste and a turbid appearance. This problem is especially aggravating when the liquid water is forced completely from the pressure channel and the then expanding steam pressure from the container expands into the coffee chamber in the form of a steam pressure thrust. The hot steam has a still higher temperature than the hot water and, in terms of percentage, solves even more bitter substances. In the worst case, this may even lead to partial burning of the coffee powder.

It is the object of the invention to make available an assembly kit through which filter coffee of good taste can be made in simple manner by means of electrical espresso machines.

According to the invention, this object is achieved by an assembly kit for a filter coffee maker as an attachment to an electrical espresso machine which has a filter carrier adapted to be attached via a bayonet-type coupling and having a coffee chamber for receiving coffee powder, and which supplies hot water and/or steam via a pressure channel to the coffee chamber of the filter carrier, with the attachment being of two-part design, with a first part having a large-volume hot water chamber following the pressure channel for almost complete receipt of the water supplied through the pressure channel, with at least one through-opening being formed in the bottom of the first part, and furthermore with a second part being provided with the coffee chamber disposed underneath the hot water chamber for receipt of the coffee powder, with the bottom thereof being provided with a coffee filter.

The hot water supplied through the pressure channel first enters the large-volume hot water chamber acting as a release and cooling space. The hot water that has flown first into the hot water chamber already begins to cool on the walls and the bottom of the hot water chamber. Entrained steam already begins to condense on the walls and the bottom. Thus, a liquid water portion forms in the hot water chamber already at the beginning, above which a steam portion forms.

Thus, only liquid water with a moderately high temperature of approx. 95° C. passes through the through-opening in the bottom of the first part and enters the coffee chamber, so that hardly any bitter substances are solved from the coffee powder. Moreover, the hot water flows through the coffee chamber at a moderate speed only, which approximately corresponds to the ordinary water flow rate in the conventional brewing of filter coffee.

The steam content supplied through the pressure channel impinges on the surface of the liquid water and then remains in the steam portion. This is especially advantageous after the liquid water has been expelled from the pressure channel, since the subsequent hot steam pressure thrust is deflected by the liquid water and does not impinge on the coffee powder.

It is possible in this manner to make a clear, strong filter coffee that is of good taste and contains hardly any bitter substances. The two-part attachment according to the invention is suitable for converting a conventional electrical espresso machine in simple manner for brewing filter coffee.

The volume of the hot water chamber preferably corresponds to approx. 80% of the water volume to be filled into the espresso machine. The hot water chamber thus can take up a large part of the water volume that is supplied relatively rapidly via the pressure channel, whereas the water flows at a moderate speed through the through-openings in the bottom of the first part. A volume of this size in this respect acts as a decelerating intermediate storage from which the hot water flows across the coffee powder in similar manner to the brewing of normal filter coffee.

The water volume to be filled into the espresso machine, in the sense of the invention, may be understood to be the maximum water volume to be filled into the espresso machine or a correspondingly smaller, desired cup volume.

It is suggested that the hot water chamber be in communication with the environment via at least one steam release opening. The steam release opening is suitable for compensating the volume of the hot water supplied through the pressure channel. The liquid water portion thus is freed from the displacement pressure. By means of the steam release opening, it is possible to compensate the pressure of the steam portion and, in particular, to carry off from the pressure channel the pressure thrust following at the end. The effect achieved thereby is a uniform, pressure-free flow of the hot water through the coffee powder, thereby producing a clear and strong coffee without bitter substances.

The steam release opening may be provided in particular on the side facing away from the bottom of the first part. The steam supplied along with the hot water thus is deflected on the water surface of the liquid portion and is led out from the opposite side. A directional continuous steam flow is created in the steam portion, which carries off the hot steam relatively rapidly.

As a modification of the invention, the coffee chamber may be connected to the environment via at least one release passage. The release passage effects a free flow of the hot water through the coffee chamber and is adapted to compensate for pressure differences.

The release passage of the coffee chamber possibly may be formed as an annular gap between the wall of the second part and the wall of the first part. The annular gap between the walls of the first and second parts thus constitutes a kind of passage channel to the environment, through which the pressure compensation takes place. The release passage thus is formed automatically during assembly of the first and second parts and in principle cannot become clogged.

It is suggested that the second part be made mainly of plastics material and that the coffee filter be a permanent filter integrated in the bottom of the second part. The second part and the coffee filter thus constitute a unit that can be handled in convenient manner. The second part may be formed, for example, by injection molding, wherein filter discs of the coffee filter are molded in.

In a particularly advantageous embodiment, the bottom of the second part may have a downwardly directed, slightly conical shape. The conical shape acts like a funnel, so that the water flown through the coffee chamber converges on the bottom of the second part and is discharged at the tip of the conical shape as a collected flow. Due to this, a coffee jet is formed that runs downwardly in compact manner. In conjunction with the permanent filter integrated in the bottom of the second part, the finished coffee already runs along the coffee filter to the tip of the conical shape, from which the jet drops in bundled manner. The cone angle thus is chosen such that the coffee powder, during brewing, is disposed in front of all filter openings and does not slide down into the cone tip.

It is conceivable that the bottom of the second part may be disposed above a receiving container directly and without interposing an additional part. It is thus possible to dispense with an additional collecting funnel as known from the prior art for brewing conventional filter coffee. The receiving container, for example the coffee pot, may be placed directly underneath the bottom of the second part.

The second part advantageously may be attached releasably to the first part through a bayonet-type coupling means. The second part, as an attachment, thus may be mounted very easily on the first part and, through the latter, to the espresso machine. For example, the first part may have the hot water chamber continuously attached to the espresso machine, whereas for repeated brewing of coffee the second part is mounted and demounted for replacing the coffee powder.

The first part possibly may be inserted at least partially in the second part in telescope-like manner. This provides an especially space-saving arrangement of the attachment and facilitates handling thereof. For example, it is also possible to provide the release passage to the coffee chamber in particularly simple manner as an annular gap between the walls of the first and second parts that are inserted into each other in telescope-like manner.

Preferably, the coffee chamber may be confined in upward direction by the bottom of the first part. The hot water from the hot water chamber thus flows directly through the through-openings in the bottom of the first part into the coffee chamber. The coffee chamber may easily be opened by taking apart the first and second parts, and the coffee powder may be replaced. Upon re-assembly, the coffee chamber is formed again automatically.

As a modification of the invention, the first part may be attachable to the espresso machine through the bayonet-type coupling.

It is suggested that the bottom of the first part approximately have a downwardly directed, slightly conical shape. This is favorable to the outflow of the hot water from the hot water chamber.

It is conceivable that the first part be formed mainly of plastics material. It may be made, for example, by injection molding, with the passage opening in the bottom being formed already during the molding operation.

An embodiment of the invention is depicted in the drawings and will be elucidated in the following. In the drawings FIG. 1 shows a longitudinal sectional view through the assembly kit according to the invention prior to mounting thereof on an espresso machine, and FIG. 2 shows a plan view of the bottom side of an assembly kit of the invention, as seen along the plane II—II of FIG. 1.

Figure 2:
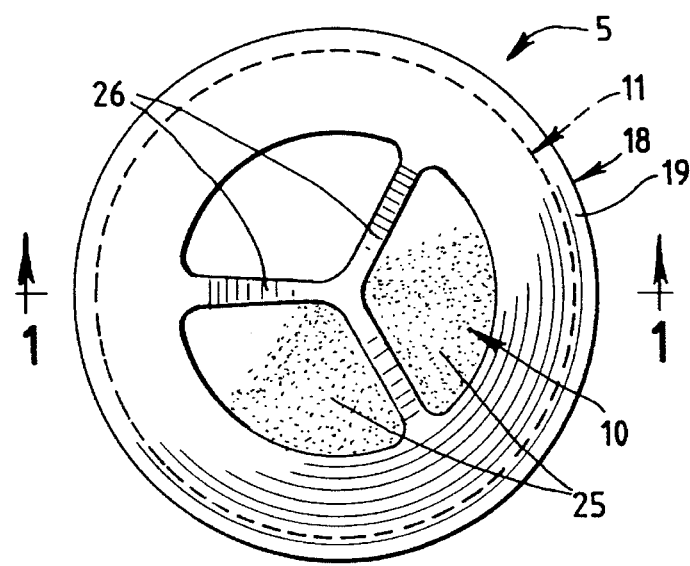

FIG. 1 shows a portion of an espresso machine 1 having a bayonet-type coupling consisting of two hook-shaped members 2. The espresso machine 1, as for the rest, is designed like any other conventional espresso machine having a steam pressure generator in the form of a container in which the filled in water is pressurized by heating and supplied to a filter carrier via a pressure channel 4. However, it is also conceivable to use for the assembly kit according to the invention an espresso machine supplying hot water through an additional pump, without a steam pressure generator being employed.

The kit according to the invention comprises an attachment 5 composed of a first part 6 and a second part 3.

The first part 6 is in the form of a pot-like container and has in its interior a hot water chamber 7. First part 6 is of substantially cylindrical configuration with a bottom 12 of conical shape, with the cone tip being directed downwardly. Disposed in the bottom 12 are evenly spaced apart through-openings 13 through which water can pass.

Adjacent bottom 12 there is provided a cylindrical wall 11 closed on its top side by a cover area 14. Cover area 14 has an upwardly directed filling neck 15. Bottom 12, cylindrical wall 11 and cover area 14 together constitute the large-volume hot water chamber 7 adapted to be connected to pressure channel 4 via filling neck 15. Filling neck 15 is directed upwardly and has perpendicularly projecting webs 16 for a bayonet-type coupling, which are adapted to be mated with the members 2 for effecting a bayonet-type connection.

Cover area 14 has circumferentially distributed steam release openings 17 connecting the hot water chamber 7 to the environment.

The second part 3 has a substantially cylindrical configuration with a bottom 9 of conical shape, with the cone tip being directed downwardly. Bottom 9 has a coffee filter 10 integrated therein which is designed as a permanent filter and retains coffee powder but allows the passage of coffee water.

First part 6 is inserted in telescope-like manner into second part 3 from above, with the second part 3 together with the bottom 12 of the first part confining a coffee chamber 8. Coffee chamber 8 is confined in upward direction by bottom 12 and connected to hot water chamber 7 via the through-openings 13.

The cylindrical wall 11 of hot water chamber 7 is of smaller diameter than the cylindrical wall 18 of the first part 6, so that upon assembly of the two parts an annular gap 19 is formed between the walls 11, 19, which connects the coffee chamber 8 to the environment. This provides a through-passage from the coffee chamber 8 to the environment.

Between the walls 11, 18 there is formed a bayonet-type coupling means 20 through which first part 6 and second part 3 may be releasably connected to each other.

The cover area 14 of the first part is extended radially beyond cylindrical wall 18 in the form of a shoulder 21. Shoulder 21 extends radially up to the end of cylindrical wall 18 of the second part 3 and is aligned with said wall. Shoulder 21 is spaced apart from wall 18 and together with the same constitutes the continuation of annular gap 19 and thus is part of the release passage 22 between coffee chamber 8 and environment.

Directly below attachment 5, there is disposed an upwardly open receiving container 23 standing on a fixed support 24.

FIG. 2 shows a bottom view of attachment 5, with the bottom 9 of the second part 3 having filtering screens 25 disposed therein, which together constitute coffee filter 10. Filtering screens 25 are integrated in bottom 9 through three webs 26. As the second part 3 consists of plastics material, filtering screens 25 are formed integrally with the second part 3 through an injection molding operation. Analogously therewith, the first part 6 also is a plastics member made by injection molding. Shown in broken line is the wall 11 of the first part 6, which together with wall 18 constitutes the annular gap 19.

In the following, the handling and mode of operation of the assembly kit according to the invention shall be elucidated in more detail.

Coffee powder is filled into the coffee chamber 8 of second part 3 that is removed from first part 6. Thereafter, second part 3 is attached to first part 6 from below via the bayonet-type coupling 20. The second part 3, together with the bottom 12 of the first part 6, then forms coffee chamber 8. First part 6 together with second part 3 may then be mounted, as attachment 5, by webs 16 to the espresso machine 1 via members 2. The first part 6 possibly may already be mounted on the espresso machine 1, so that it is merely necessary to attach the second part 3 from below. Directly below attachment 5, the receiving container 23 is placed on support 24.

Espresso machine 1 has water filled therein in a heatable container that is pressurized by heating. Upon opening of the container, hot water is injected via pressure channel 4 and filling neck 15 into hot water chamber 7. The hot water collects in the large-volume hot water chamber, and possibly contained steam therein may already cool on the walls 11 and begins to condense. Large-volume hot water chamber 7 serves as a cooling and expansion chamber and constitutes a collecting space for the rapidly injected hot water.

Above the bottom 12 of first part 6, there is immediately formed a liquid portion 27 above which steam collects in a steam portion 28. The pressurized steam is adapted to escape through steam release openings 17. The majority of the pressure of the injected hot water is thus set free towards the environment. The hot water injected thereafter impinges on water surface 29 of the liquid portion 27, with the hot water collecting in liquid portion 27 and the steam entrained therein being reversed at the water surface 29 and escaping through steam release openings 17.

Hot water flows from liquid portion 26 downwardly through through-openings 13 into coffee pot 8 while flowing through the coffee powder and passing through coffee filter 10. From the coffee filter 10, the water collects at the cone tip of bottom 9 and flows as a compact jet from said tip into receiving container 23.

By way of the release passages 22 between first part 6 and second part 3, the coffee chamber 8 balances the pressure with the environment, so that a free flow of the hot water through the coffee powder is ensured at all times.

In terms of volume, more hot water is within short injected into hot water chamber 7 than can flow off through the through-openings 13 into coffee chamber 8. The majority of the water thus becomes collected in hot water chamber 7 in which the pressure compensation takes place, and the water flows slowly through coffee chamber 8, as necessary for brewing ordinary coffee powder.

The liquid portion 27 effects a separation of the steam, which no longer comes into contact with the coffee powder. The very hot steam thus can no longer solve bitter substances from the coffee powder, and the coffee powder is not burnt either. This holds also for the steam thrust supplied last from pressure channel 4, when the steam generator has expelled all water. The hot steam thrust first impinges on water surface 29 of liquid portion 27 and is carried off to the outside through steam release opening 17.

The assembly kit according to the invention renders possible the use of a conventional electrical espresso machine for making filter coffee, simply by applying the attachment 5 as assembly kit. The remaining operation of the espressor machine 1 remains essentially the same.

Although the specific advantages of the assembly kit are prominent mainly in case of steam pressure machines, the assembly kit may equally be used also in so-called pump machines.

We claim:

1. An assembly kit for a filter coffee maker as an attachment (5) to an electrical espresso machine (1) having a filter carrier adapted to be attached via a bayonet-type coupling and having a coffee chamber (8) for receiving coffee powder, and suppling hot water and/or steam via a pressure channel (4) to the coffee chamber (8) of the filter carrier, the attachment (5) comprising a two-part design, with a first part (6) having a large-volume hot water chamber (7) following said pressure channel (4) for almost complete receipt of the water supplied via said pressure channel (4), with at least one through-opening (13) being formed in the bottom (12) of said first part (6), and said second part (3) being provided with said coffee chamber (8) disposed underneath said hot water chamber (7) for receipt of the coffee powder, with the bottom (9) of said second part (3) being provided with a coffee filter (10).

2. An assembly kit according to claim 1, wherein the volume of said hot water chamber (7) corresponds to about 80% of the water volume to be filled into the espresso machine (1).

3. An assembly kit according to claim 1, wherein said hot water chamber (7) is connected to the environment through at least one steam release opening (17).

4. An assembly kit according to claim 3, wherein said steam release opening (17) is provided on the side facing away from said bottom (12) of said first part (6).

5. An assembly kit according to claim 1, wherein said coffee chamber (8) is connected to the environment through at least one release passage (22).

6. An assembly kit according to claim 5, wherein said release passage (22) of said coffee chamber is in the form of an annular gap (19) between the wall (18) of said second part (3) and the wall (11) of said first part (6).

7. An assembly kit according to claim 1 or 6, wherein said second part (3) consists predominantly of plastics material and said coffee filter (10) is a permanent filter integrated in said bottom (9) of said second part (3).

8. An assembly kit according to claim 1 or 6, wherein said bottom (9) of said second part (3) has a downwardly directed conical shape.

9. An assembly kit according to claim 1 or 6, wherein said bottom (9) of said second part (3) is adapted to be disposed directly above a receiving container (23), without the interposition of an additional part.

10. An assembly kit according to claim 1 or 6, wherein said second part (3) is adapted to be releasably mounted on said first part (6) through a bayonet-type coupling means (20).

11. An assembly kit according to claim 1 or 6, wherein said first part (3) is at least partially inserted in said second part (3) in a telescope-like manner.

12. An assembly kit according to claim 1 or 6, wherein said coffee chamber (8) is confined in upward direction by said bottom (12) of said first part (6).

13. An assembly kit according to claim 1 or 6, wherein said first part (6) is adapted to be attached to the espresso machine (1) via the bayonet-type coupling.

14. An assembly kit according to claim 1 or 6, wherein said bottom (12) of said first part (6) has approximately a downwardly directed conical shape.

15. An assembly kit according to claim 1 or 6, wherein said first part (6) consists predominantly of plastics material.

16. An assembly kit according to claim 1, 2, or 3, wherein the water is supplied to said hot water chamber (7) by means of a steam pressure generator.

* * * * *